United States Patent
Costa et al.

(10) Patent No.: US 12,363,141 B2
(45) Date of Patent: Jul. 15, 2025

(54) REAL-TIME DETECTION AND PREVENTION OF ONLINE NEW-ACCOUNT CREATION FRAUD AND ABUSE

(71) Applicant: Akamai Technologies, Inc., Cambridge, MA (US)

(72) Inventors: Nadav George Costa, Ramat Gan (IL); Ziv Eli, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 146 days.

(21) Appl. No.: 17/723,518

(22) Filed: Apr. 19, 2022

(65) Prior Publication Data
US 2023/0336571 A1 Oct. 19, 2023

(51) Int. Cl.
*H04L 9/40* (2022.01)
*G06N 3/04* (2023.01)
*H04L 51/08* (2022.01)
*H04L 51/212* (2022.01)

(52) U.S. Cl.
CPC .......... *H04L 63/1416* (2013.01); *G06N 3/04* (2013.01); *H04L 51/08* (2013.01); *H04L 51/212* (2022.05); *H04L 63/1483* (2013.01)

(58) Field of Classification Search
CPC ... H04L 63/1416; H04L 51/212; H04L 51/08; H04L 63/1483; H04L 63/1425; H04L 63/1441; H04L 63/0236; H04L 63/107; G06N 3/04; G06N 20/00
See application file for complete search history.

(56) References Cited

U.S. PATENT DOCUMENTS

| | | | |
|---|---|---|---|
| 11,010,436 B1* | 5/2021 | Peng | G06F 16/9532 |
| 2004/0260922 A1 | 12/2004 | Goodman et al. | |
| 2007/0039038 A1 | 2/2007 | Goodman et al. | |
| 2007/0118904 A1 | 5/2007 | Goodman et al. | |
| 2012/0254333 A1 | 10/2012 | Chandramouli et al. | |
| 2018/0337782 A1* | 11/2018 | Wu | H04L 9/32 |
| 2019/0180196 A1 | 6/2019 | Terry et al. | |
| 2019/0349351 A1 | 11/2019 | Verma et al. | |

(Continued)

OTHER PUBLICATIONS

Djosic et al., "Machine Learning in Action: Securing IAM API by Risk Authentication Decision Engine," 2020 IEEE Conference on Communications and Network Security (CNS) Year: 2020 | Conference Paper | Publisher: IEEE.*

(Continued)

*Primary Examiner* — Roderick Tolentino
(74) *Attorney, Agent, or Firm* — David H. Judson

(57) ABSTRACT

A method, apparatus and computer program product for real-time new account fraud detection and prevention. The technique leverages machine learning. In this approach, first and second computational branches of a machine learning model are trained jointly on a corpus of emails. Following training, an arbitrary email is received. The arbitrary email is then applied through the computational branches of the machine learning model. The first branch has an attention layer, and the second branch has a convolutional layer. The outputs of the branches are aggregated into an output that is then applied through another self-attention layer to generate a score. Based on the score, the arbitrary email is characterized. If the email is characterized as fraudulent, a mitigation action is taken.

21 Claims, 6 Drawing Sheets

(56) References Cited

U.S. PATENT DOCUMENTS

| | | | |
|---|---|---|---|
| 2020/0067861 A1 | 2/2020 | Leddy et al. | |
| 2020/0311265 A1 | 10/2020 | Jones et al. | |
| 2020/0334539 A1* | 10/2020 | Wang | G06N 20/20 |
| 2020/0394998 A1* | 12/2020 | Kim | G10L 13/10 |
| 2021/0203693 A1 | 7/2021 | Clausen et al. | |
| 2021/0266294 A1 | 8/2021 | Chechik et al. | |
| 2021/0374754 A1 | 12/2021 | Pandian et al. | |
| 2021/0374911 A1 | 12/2021 | Kudo et al. | |
| 2021/0390411 A1 | 12/2021 | Carvalho et al. | |
| 2022/0116420 A1* | 4/2022 | Weber | G06F 21/554 |
| 2022/0279015 A1* | 9/2022 | Sambamoorthy | H04L 51/212 |
| 2022/0351842 A1* | 11/2022 | Zheng | G16H 50/20 |
| 2022/0374703 A1* | 11/2022 | Rigotti | G06N 3/084 |
| 2023/0059190 A1* | 2/2023 | Walters | G06N 3/0464 |
| 2023/0171287 A1* | 6/2023 | Slobodyanuk | H04L 51/212 |
| | | | 726/23 |

OTHER PUBLICATIONS

Maheswari et al., "Machine learning forensics to gauge the likelihood of fraud in emails," 2021 6th International Conference on Communication and Electronics Systems (ICCES) Year: 2021 | Conference Paper | Publisher: IEEE.*

PCT/US2023/019115, International Search Report and Written Opinion mailed on Aug. 1, 2023, 11 pages.

* cited by examiner n.er.ota.w.i.l613@gmail.com  
ne.r.o.tawi.l613@gmail.com  
n.er.ota.w.i.l613@gmail.com  
ner.o.tawi.l613@gmail.com  
ne.r.ota.w.il.613@gmail.com  
FIG. 5
250156772hwjwui@activist.com  
ses2esssrrssssssssitsen@yahoo.com  
cfhgvjg@atheist.com  
FIG. 6
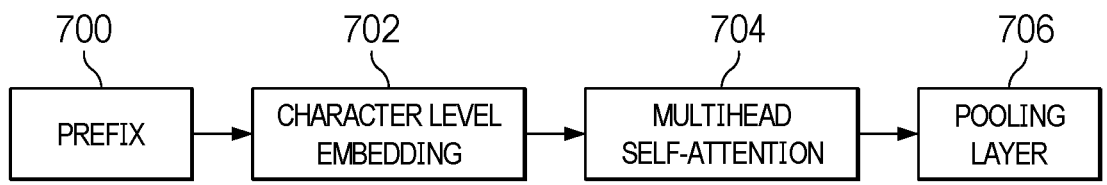
FIG. 7
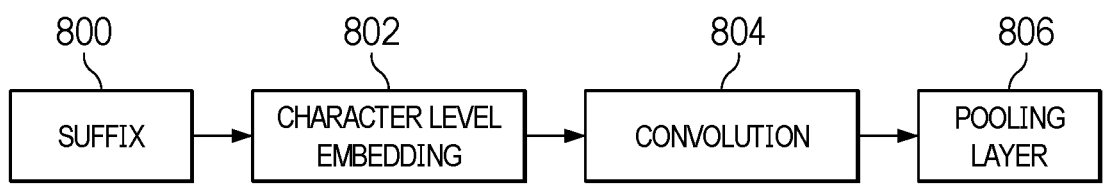
FIG. 8

REAL-TIME DETECTION AND PREVENTION OF ONLINE NEW-ACCOUNT CREATION FRAUD AND ABUSE

BACKGROUND

Technical Field

This application relates generally to network security and, in particular, to techniques that detect and prevent new account fraud (NAF).

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Account takeover on the Internet is a significant problem, resulting is significant losses. There are known technologies and services that address this problem. For example, and in the CDN space, Akamai® Bot Manager helps mitigate bot-driven credential abuse and account takeover attempts. Solutions of this type have also been extended to enable service customers to fight against both automated and human fraud attacks related to account takeover (ATO) and new account fraud (NAF). ATO refers to an attack by which a malicious actor gains access to a victim's account at a web site or application. ATO is frequently accomplished via credential stuffing attacks, whereby credentials from previous user database breaches are tried in an iterative fashion against one or more web sites. Successful ATO leads to a compromised account. NAF is an attack by which a malicious actor creates an account at a web site or application by claiming to be a person other than their true identity. These may be the result of identity theft, using a real person's identity to create a new account without their knowledge. This may also be a synthetic identity, e.g., created using a collection of attributes include name, address, phone number, and email address where the combination does not truly represent a real person. The purpose of NAF is typically to gain benefits of a new account, such as a free trial period, coupons, discounts, loyalty points, miles, and rewards. These benefits are then combined and resold to others who cash out by redeeming those points, miles, or for items of value.

The most common NAF scenario arises during registrations in which email addresses are required. As noted above, when creating a new account, the user is often required to deliver several identifying fields, such as username, password, and an active email address. Often, when a user's intentions are fraudulent, the applied signals will generally tend to be obscured to mask the user's real identity. Also, and to maximize personal gain, the fraudster may create many new accounts, which complicates detection. Indeed, by focusing on email-based signals, the user has many ways to create fake and/or temporary email address(es) that will serve his or her attack. In one common approach, the attacker leverages the fact that certain types of email addresses (e.g., Gmail® accounts) are invariant with respect to points (dots) added in the username (prefix) portion of an email address. Thus, for example, the email addresses moshe.moshe@gmail.com and moshemoshe@gmail.com represent the same email account. Fraudsters exploit this fact to give multiple (often elegantly different) emails, thereby creating multiple accounts using the same email box. In other words, by adding and shifting points in the username part of email, many aliases are created. Another common way fraudsters hide their identity and create imaginary email accounts is to use random string(s) in the name part (prefix) of the email, e.g., 250156772hwjwui@activist.com. Still another approach to fraudulent email account registration for NAP involves creating a disposable email account just at the time of the attack.

BRIEF SUMMARY

A method, apparatus and computer program product for real-time new account fraud detection and prevention. The technique leverages machine learning. In this approach, a machine learning model that comprises two (2) computational branches, and an output branch, is trained on a corpus of emails, wherein an email of the corpus is configured as {prefix@ suffix.TLD}, wherein TLD is a top-level domain. During training, a first computational branch of the model processes the prefix, and the second computational branch of the model processes the suffix.TLD. The two computational branches (corresponding to the prefix, and the suffix.TLD) of the machine learning model are trained on the corpus jointly. Preferably, the first computational branch of the machine learning model comprises a neural network and, in particular, a multi-head self-attention mechanism. The second computational branch of the machine learning model comprises a convolutional neural network having a convolutional layer. The respective attention and convolutional layers act upon different character-level embeddings for respective prefix (username) and suffix (domain name) portions of an mail. To that end, and during a prediction operation, an arbitrary email is received. Typically, the arbitrary email is associated with an attempt by a user to establish a new account associated with some protected resource, such as a web site or application. The arbitrary email is applied through the machine learning model to generate a score. Based on the score, a determination is made regarding whether the arbitrary email is potentially fraudulent. If so, a mitigation action is then taken to prevent the fraud.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 5 depicts a first type of attack vector commonly used by fraudsters to obtain new accounts;

FIG. 6 depicts a second type of attack vector that is commonly used;

FIG. 7 depicts a high level operation of a "prefix" computational branch of a learning system according to this disclosure;

FIG. 8 depicts a high level operation of a "suffix" computational branch of the learning shown;

DETAILED DESCRIPTION

Figure 1:
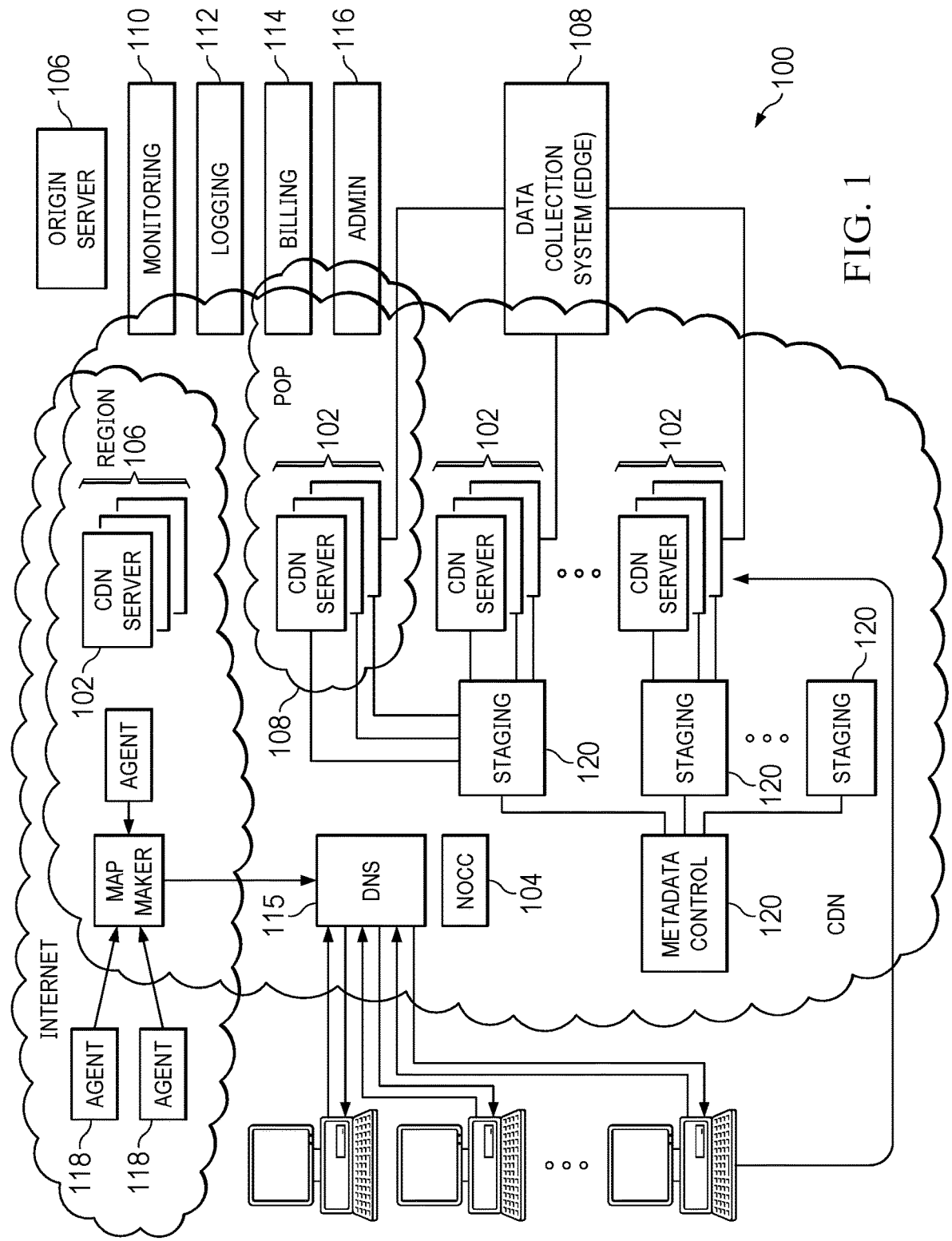
FIG. 1 is a block diagram illustrating a known distributed computer system configured as a content delivery network (CDN)

A representative online system in which real-time detection and prevention of new account fraud (NAF) is implemented according to this disclosure is depicted in FIG. 1. The system is a content delivery system. This implementation is not intended to be limited, as the techniques herein may be practiced in any type of computer system, in a standalone manner, or as a particular function of some other computer-implemented system, device, process, or the like.

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
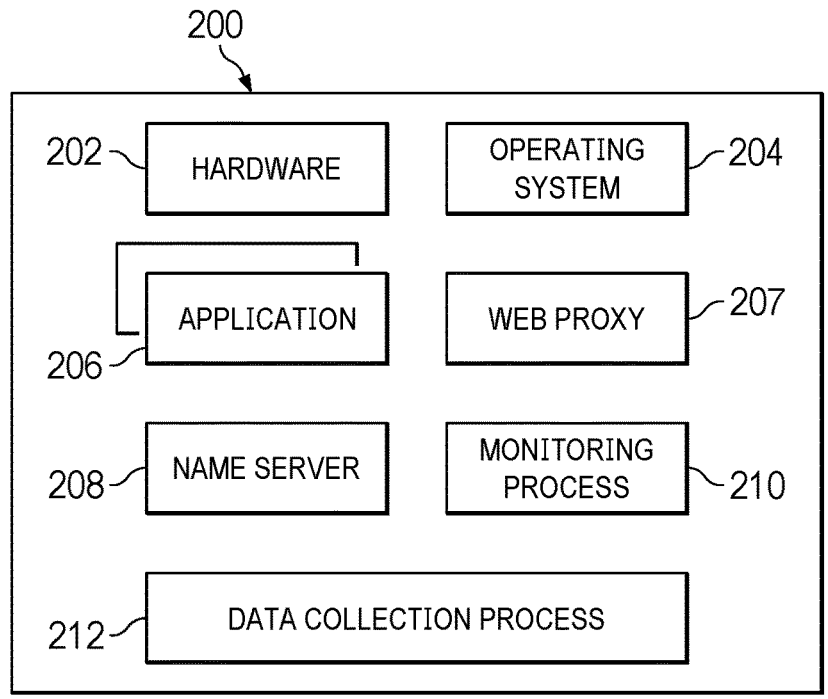
FIG. 2 is a representative CDN edge machine configuration.

As illustrated in FIG. 2, a given machine 200 comprises commodity hardware (e.g., an Intel® processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a global host process), a name server 208, a local monitoring process 210, a distributed data collection process 212, and the like. The HTTP proxy 207 or "edge server") serves web objects, streaming media, software downloads and the like. A CDN edge server is configured to provide one or more extended content delivery features, preferably on a domain-specific, customer-specific basis, preferably using configuration files that are distributed to the edge servers using a configuration system. For example, a given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
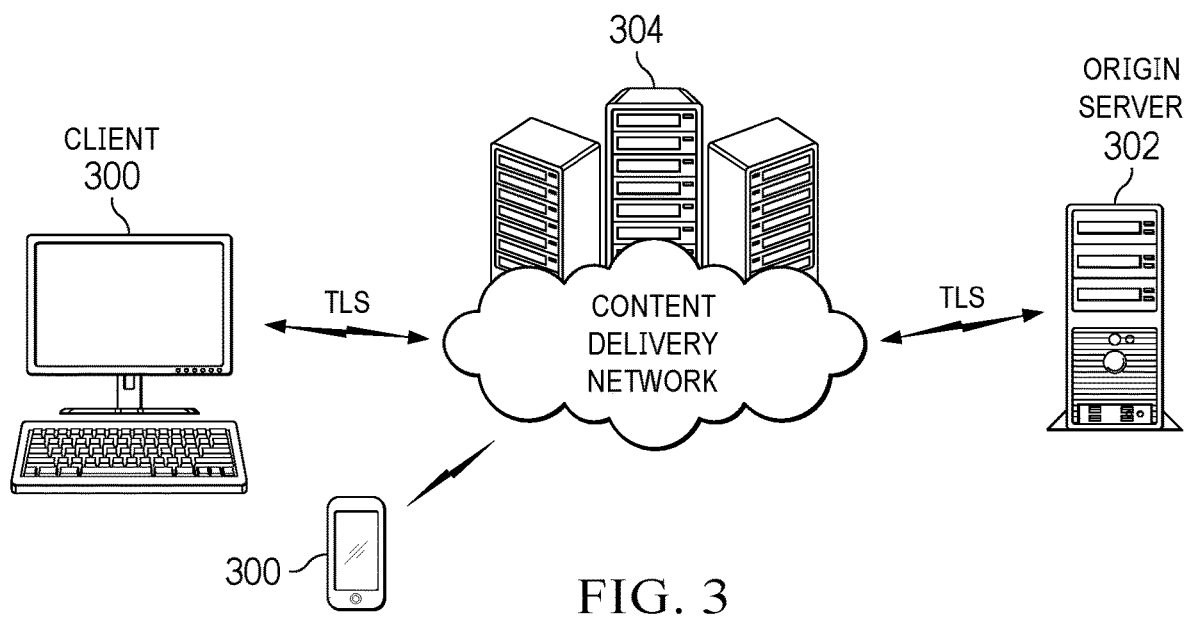
FIG. 3 depicts a representative client machine interaction with an origin server via a content delivery network.

As illustrated in FIG. 3, in the typical interaction scenario, an end user client browser or mobile app 300 is associated with a customer origin server (or "origin") 302 via the intermediary of an overlay network edge machine server instance 304 (the "edge server"). The terms "origin" or "edge" are not intended to be limiting.

A content delivery network such as described above may be augmented to provide a user recognition (sometimes referred to as "account protection") service to prevent user login or other protected endpoint request abuse, preferably in association with a bot detection system. User recognition refers to a feature that recognizes a user not necessarily (or solely) based on a provided user identifier and credentials, but also on other one or more other characteristics. To this end, and in an embodiment described in U.S. Publication No. 2021/0226987, the service collects user recognition data, preferably for each login attempt (e.g., data about the connection, session, and other relevant context), and it constructs a true user profile for each such user over time, preferably using the recognition data from successful logins. Preferably, the profile evolves as additional recognition data is collected from successful logins. As such, the true user profile is a model of what the user "looks like" to the system. For a subsequent login attempt, the system then calculates a true user score. This score represents how well the current user recognition data matches the model represented by the true user profile. Preferably, the user recognition service is used to drive different policy decisions and enforcement capabilities. Thus, e.g., for an account protection service, user recognition facilitates enforcing a policy-driven security model, e.g., as a policy decision point (PDP) that determines what action to take on an authentication attempt, and the ancillary control by a policy enforcement point (PEP) that implements a policy decision. Preferably, user recognition such as described above works in association with bot detection in a combined solution.

It is also assumed that the CDN has some basic capability to recognize an account owner and to provide an access decision based on such recognition. In particular, a system of this type has the capability to determine that it has seen a particular user previously, typically based on data that the system holds that allows such recognition, and this is so whether or not the system also knows the user's actual identity (who he or she purports to be). A representative system of this type is Akamai® Identity Cloud, which provides a secure, seamless, scalable customer identity and access management (CIAM) service. This service provides for a wide array of authentication methods, including social media login, directory services, and OpenID Connect (OIDC), role-based and attribute-based access control (RBAC and ABAC), and risk-based and multi-factor authentication options, for secure access and single sign-on (SSO) across the customer's ecosystem. Preferably, the service is cloud-native, and it is provided (in association with one or more other CDN services) as a service (namely, a SaaS) solution. As such, it is designed to intelligently scale to ensure that customer registration, authentication, and SSO functions are always available and perform with the lowest latency.

Figure 4:
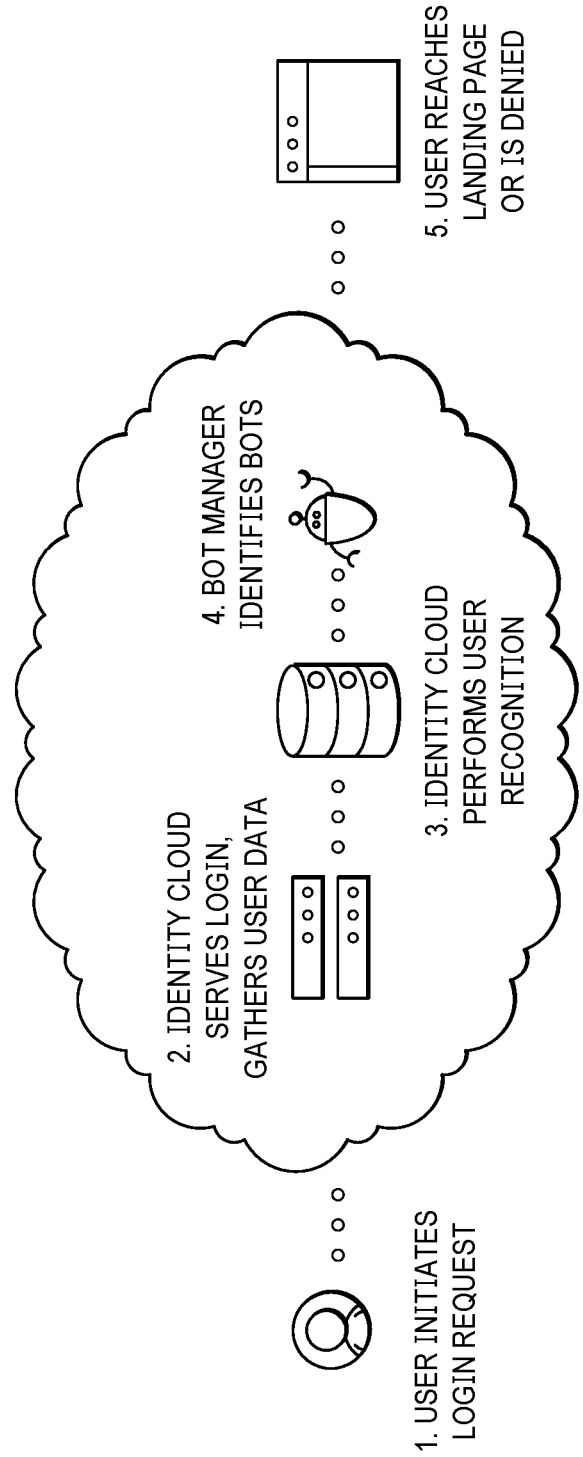
FIG. 4 is a depiction of a user recognition service that provides for real-time detection of false users.

FIG. 4 depicts an account protection service in operation. Systems/services identified by their commercial names (Akamai® Identity Cloud, Akamai® Bot Manager) are merely exemplary and are not intended to be limiting. At step (1), the user initiates a login request. At step (2), Identity Cloud (the CIAM service) services the login, and gathers user data (as explained in more detail below). At step (3), Identity Cloud performs user recognition as provided for herein. At step (4), Bot Manager (the bot detection service) identifies bots. At step (5), the user reaches the landing page (when no login fraud is detected) or is denied (when a potential login fraud is detected). According to the approach, the true user score enables the CIAM (or other) service to measure end user risk.

With the above as background, the techniques of this disclosure are now presented in detail.

Detection and Prevention of Account Fraud and Abuse

As noted above, a common account fraud scenario arises during registrations in which email addresses are required. In one common approach, the attacker leverages the fact that certain types of email addresses (e.g., Gmail® accounts) are invariant with respect to points (dots) added in the username (prefix) portion of an email address. The attacker uses this characteristic and creates multiple accounts that end up associated with the same email box. FIG. 5 depicts a set of NAFs that attempt to use this trick of adding and shifting points in the username portion of the email to create multiple aliases. FIG. 6 depicts another common way a fraudster may attempt to hide his or her identified, namely, by creating imaginary email accounts that use random string(s) in the name part (prefix) of the email. As also described, these are just representative NAF techniques. The detection and prevention approaches of this disclosure are not limited for use with any particular attack vector.

To address the myriad of attack vectors, the approach herein is now described. As will be seen, the solution involves machine learning and, preferably, distinct types of machine learning that are applied (concurrently) to distinct portions of an email. With respect to an email configured as {prefix@ suffix.TLD}, the portions are (i) the prefix portion, corresponding to characters (preferably all of them) to the left of the @ character, and (ii) the suffix.TLD portion, corresponding to characters (preferably all of them) to the right of the @ character. TLD represents a top-level domain, of any type (e.g., ARPA, gTLD, grTLD, sTLD, ccTLD, tTLD, and the like). In an alternative embodiment, the suffix may comprise some other portion of a DNS hierarchy. The prefix is sometimes referred to as the username portion, and the suffix.TLD is sometimes referred to as the domain name portion. As will be seen, the approach here provides for joint analysis and processing of email parts to provide a robust fraudulent email detection and prevention mechanism. Typically, that mechanism acts as a front-end to some other security system or device, e.g., a system that protects resources (such as web sites or pages, web or other applications, etc.) from abuse.

In general, the machine learning is carried out in two (2) phases: training, and prediction. During training, a machine learning model is trained from a corpus of emails. After the model is trained, a prediction is then carried out using the trained model and with respect to an arbitrary email. As will be described, the prediction outputs a score that is then used to determine whether the arbitrary email is considered by the learning system to represent a potential account fraud.

Generalizing further, the machine learning here preferably leverages deep neural networks (NN). Formally, one type of a NN is a function g: X→Y, where X is an input space, and Y is an output space representing a categorical set in a classification setting (or a real number in a regression setting). For a sample x that is an element of X, $g(x)=fL (fL-1 ( \ldots ((f1(x))))$. Each fi represents a layer, and fL is the last output layer. The last output layer creates a mapping from a hidden space to the output space (class labels)

through a function (e.g., a softmax, a sigmoid, or others) that outputs a vector of real numbers in the range [0, 1] that add up to 1. The output of the softmax function is a probability distribution of input x over C different possible output classes.

As is well known, machine learning algorithms learn from data, thus allowing the system to find hidden insights without being explicitly programmed where to look. ML tasks are typically classified into various categories depending on the nature of the learning signal or feedback available to a learning system. Some examples include supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, boosting techniques, and neural networks.

Here, the training data typically comprises a large corpus of emails including at least some that have been labeled as NAF (or the like). As will be seen below, preferably the machine learning herein comprises two (2) branches of computation that are eventually united to score an arbitrary email (as being potentially fraudulent or not). These computational branches correspond to the respective prefix and suffix.TLD portions of an email. Two different computational branches are implemented to provide optimal processing filters for each of the two different types of email parts that exhibit very different characteristics. As depicted and described above, patterns corresponding to the username portion can utilize many different patterns or wildly-random strings yet still correspond to or be accepted as a single account. Patterns corresponding to the domain name portion, in contrast, are much more regulated. The model is trained to recognize these differences (and, in particular, that the distribution of characters used in creating prefixes and suffixes are different) by implementing the distinct types of computational layers. These distinct types learn different character-level embedding layers for each of these two parts.

FIG. 7 depicts a preferred prefix computational branch of the learning. This computational branch (or "pipeline") takes the prefix 700, performs character-level embedding 702, and then applies a first machine learning 704. Preferably, the learning is a multi-head self-attention model. The outputs from the model are then pooled in a pooling layer 706. Self-attention, also called intra-attention, is an attention mechanism relating different positions of a single sequence in order to compute a representation of the same sequence. Pooling enables the model to reduce its number of parameters by scaling down the size of representations, thus avoiding overfitting.

FIG. 8 depicts a preferred suffix computational branch of the learning. This computational branch takes the suffix 800, performs character-level embedding 802, and then applies a second machine learning 804, and the outputs of applying the model are then pooled in a pooling layer 806. Preferably, the model is a convolutional neural network (CNN). A CNN is also known as a shift-invariant or space-invariant artificial neural network, based on a shared-weight architecture of convolution kernels or filters that slide along input features and provide translation-equivariant responses known as filter maps. CNNs are regularized versions of multi-layer perceptrons, which are fully-connected networks wherein each neuron in one layer is connected to all neurons in the next layer. Pooling to prevent overfitting include penalizing parameters during training (such as weight decay) or trimming connectivity, or the like.

As will be described, training the model also involves aggregating the signals generated from the respective branches into a single signal upon which an additional computational branch is applied. This additional computational branch is sometimes referred to herein as an output branch, and preferably this branch (like the prefix branch) includes a self-attention layer that represents attention over prefix versus suffix.

The computational branches depicted in FIGS. 7 and 8 operate concurrently. The data feed applied to the model is the corpus of emails, as previously described, and thus the prefix and suffix portions of the email are processed independently. The system decomposes each email (at the @ sign) into its corresponding two parts for processing through the respective computational branches, and then the resulting signals are composed (aggregated) and applied through the output branch. Once the model is trained (or re-trained), the trained model is used for prediction, which is now described.

Figure 9:
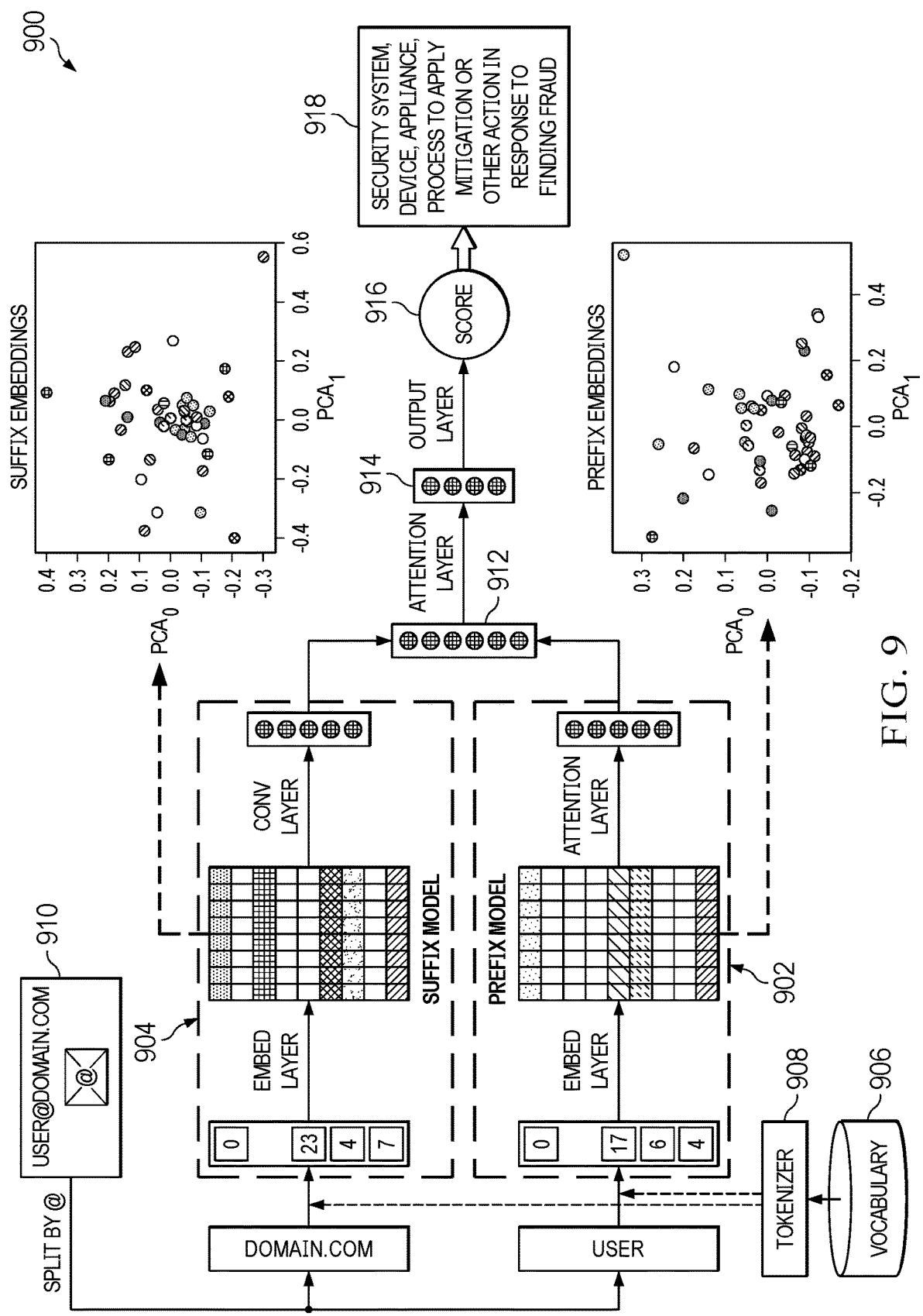
FIG. 9 depicts a preferred embodiment of the machine learning system operating to provide a prediction regarding whether an arbitrary email represents potential fraudulent account activity.

In particular, FIG. 9 depicts a preferred embodiment of the machine learning system 900 to predict whether an arbitrary email should be characterized as potentially fraudulent. As depicted in this example embodiment, the machine learning typically acts as a front-end to a back-end security system, device, appliance, process, or the like that takes a decision made by the learning system and then applies one or more mitigation actions. Typical mitigation actions include, without limitation, rejecting an account registration request, issuing a notification or other alert, blocking an IP address associated with a suspect user, sandboxing an email or account for further analysis, adding or updating a blacklist, rate-limiting one or more follow-on registration requests, updating one or more learning models, adding the email to a new set of training data, or the like.

As noted above, the machine learning model comprises the prefix computational branch 902, and the suffix.TLD computational branch 904. As previously noted, the prefix branch 902 preferably includes an attention layer. The suffix.TLD computational 904 preferably is a convolutional layer. The branches have been trained on the corpus of emails. A vocabulary 906 and tokenizer 908 are used to facilitate the training and recognition in a known manner, namely, to enable sequences of text to be broken down into smaller parts (tokens) and then fed as input in the model. An arbitrary email 910 received at the system for evaluation is split at the @ character in to the user (prefix) and domain-.com (suffix.TLD) portions, applied through the respective branches 902 and 904, and then output. As depicted in FIG. 9, the two branches are aggregated to a single vector upon which an additional self-attention layer 912 (which represents attention over prefix versus suffix) is then applied and where eventually an output layer 914 is set for transforming the final email-vector into a scalar score ($0 \leq s \leq 1$) 916. The self-attention layer 912 and output layer 914 comprise an output computational branch of the machine learning model. By comparing the score to some threshold, which threshold may be configurable, the system characterizes the arbitrary email 910, typically as a binary (fraudulent/not fraudulent) output. The score may be associated with a confidence level.

Although not depicted, the score may be written to a log or otherwise directed to other computing systems have an interest therein. One such system is the account protection system shown in FIG. 4, but this is not a limitation. The back-end may comprise a policy management system, a SIEM, a policy enforcement point (PEP), or any other type of computing system, machine, program, process, operating thread, and the like.

Figure 10:
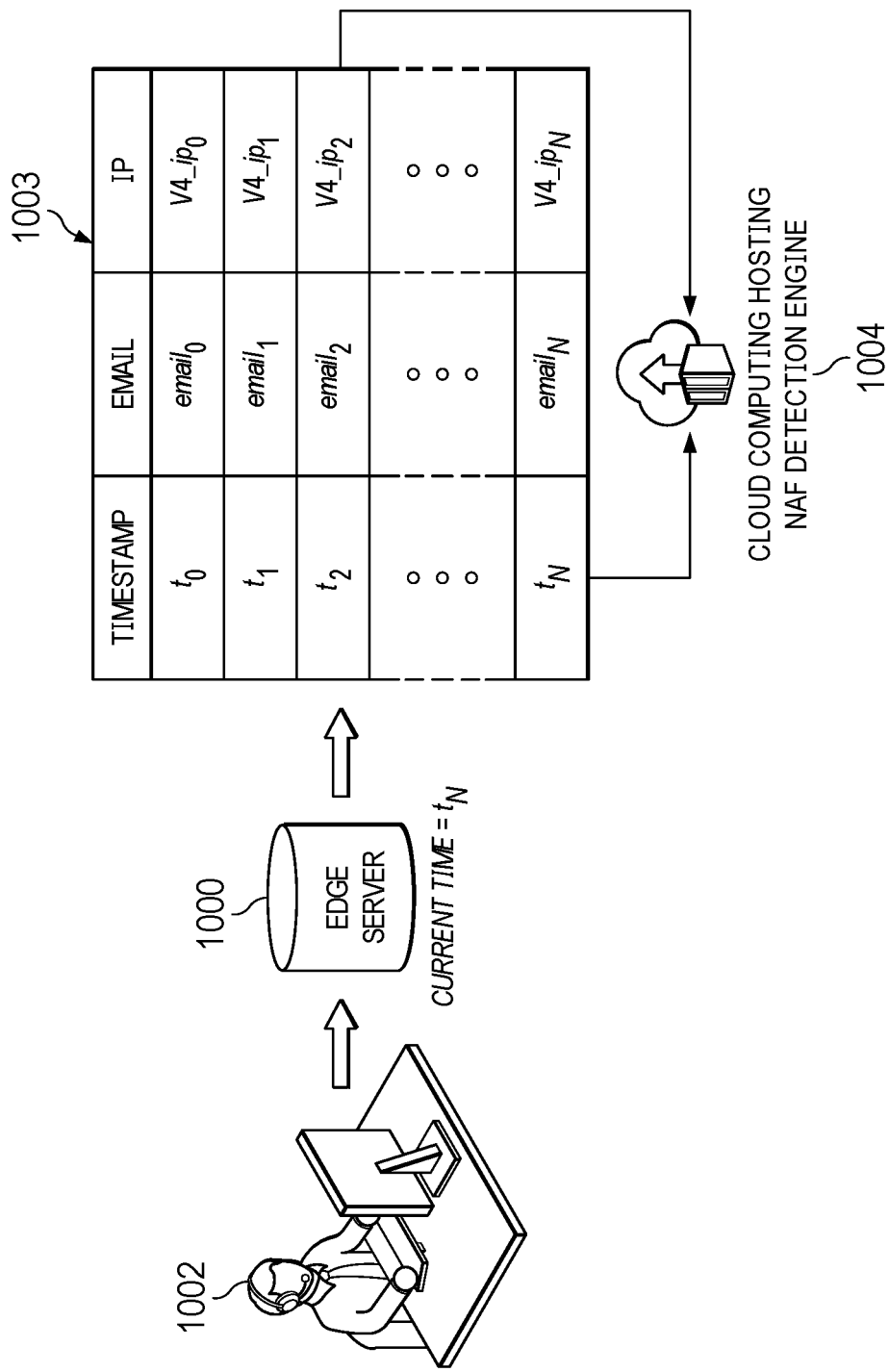
FIG. 10 depicts a representative implementation wherein a content delivery network (CDN) edge is configured to provide log data to a cloud computing-based NAF detection engine.

FIG. 10 depicts a technique for real-time detection of NAF activity in the context of a CDN edge server. The CDN edge server is configured as a machine such as shown in FIG. 2, and it forms part of the larger overlay network. In this example scenario, the edge server 1000 monitors any new account opening (e.g., from user 1002), preferably in real-time. FIG. 10 depicts the online flow of log data 1003 to be used for NAF detection. In this example, the data comprises a tuple {timestamp, email, IP address}. The real-time information is provided to the NAF detection engine 1004, which is typically hosted in a cloud computing environment (or other CDN back-end system). Once a new account opening is triggered, the system reads it immediately and consequently can determine its status with respect to being benign/fraudulent by using the above-described methodology and ML model. As depicted, the NAF detection engine may collect many signals that are associated with the registration process.

Typically, the machine learning is carried out in a compute cluster. Once the model is trained, it is instantiated in a detection process or machine as previously described.

The model may be re-trained with additional or updated training data.

Preferably, the threshold between a score representing a trustworthy and an untrustworthy email address is configurable.

Preferably, when the arbitrary email is not trustworthy (worse than a threshold), preferably no account is issued.

When implemented in a CDN, configurations at the CDN edge may be used to coordinate collecting data to be used in initial data modeling, and to facilitate the detection and/or prevention operations based on that data.

The techniques herein provide significant advantages. The approach provides for a deep learning network that utilizes character level representations of email addresses and is designed for a classification task of detecting fraudulent email patterns. A security product or service that leverages the machine learning facilitates the detection and prevention of fraudulent activity in web applications through the abuse of the account registration process in the application. Fraudsters abuse the registration process to generate multiple accounts that are later on used to perform fraudulent actions on the compromised website. These activities include, but are not limited to, (1) reward program and promotion abuse (2) gift card discovery by enumeration (3) credit card validation, for selling stolen credit cards (4) fraudulent transactions using stolen credit cards. The newly-registered accounts are a means to perform the fraudulent activity, as they are provided with more privileges than a guest visiting the site. Examples of these higher-privileges often include: (a) an ability to add saved credit cards (b) an ability to transact (c) Special promotions for new account holders. Because these privileges are limited per account, the attackers attempt to scale their account creation process and generate multiple dozens or even hundreds of fake accounts on the web application, to be able to perform more of these actions or receive more rewards and cash out. As previously described, a challenging part is that this abusive account creation process does not follow a single pattern, but uses many different variations of bots, human signups, proxies, VPNs, residential IP addresses, public email addresses, private domain emails, hijacked email accounts etc. The deep learning approach of this disclosure addresses these issues by providing for real-time detection and prevention of new account opening fraud in online retail businesses. Typically, when a new account is created, a few signals of the registration become available on the fly. These often include the registrant's email address, the IP address of registration and also the chosen username and password. The described provides a system that, based on these raw signals, learns to deliver a probability for the registration being fraudulent. More specifically, the approach herein analyzes the syntax of the used email address, e.g., to detect patterns of registrations that are normally committed by fraudulent users.

Although not intended to be limiting, the detection is performed with low latency, reliably and at large scale.

While the approach herein is designed specifically for email addresses, the bifurcated modeling approach, e.g., wherein one computational branch operates an attention layer and the other computational branch operates a convolutional layer depending on which portion of some data string is being processed, and where these layers act upon different embedding layers for respective distinct parts of the data string and whose outputs are then aggregated and then applied through an additional self-attention layer, may be leveraged for other Natural Language Processing (NLP) tasks.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Other types of machine learning may be used to augment or to facilitate the building of the prefix and suffix computational branches as described herein.

What we claim is as follows:

1. A method of account protection, comprising:
training a machine learning model on a corpus of email addresses, wherein an email address of the corpus is configured as {prefix @suffix.TLD}, wherein TLD is a top-level domain, the machine learning model comprising first and second computational branches, and an output branch that aggregates signaling from the first and second computational branches, and wherein concurrently the prefix of a given email address is processed through the first computational branch and the suffix.TLD of the given email address is processed through the second computational branch;
during a prediction phase:
receiving an arbitrary email address;
applying the arbitrary email address through the machine learning model;
in response to applying the arbitrary email address through the machine learning model, determining whether the arbitrary email address is potentially fraudulent; and
responsive to a determination that the arbitrary email address is potentially fraudulent, taking a mitigation action to protect the account.

2. The method as described in claim 1 wherein the first computational branch of the machine learning model comprises a neural network.

3. The method as described in claim 2 wherein the neural network is a multi-head self-attention mechanism.

4. The method as described in claim 2 wherein the second computational branch of the machine learning model comprises a convolutional neural network.

5. The method as described in claim 1 wherein applying the arbitrary email address through the machine learning model comprises:
applying attention-based machine learning to the prefix of the arbitrary email address to generate a first output;
applying convolution-based machine learning to the suffix of the arbitrary email address to generate a second output;
aggregating the first and second outputs to generate a third output; and
applying the third output through an additional attention layer of the output branch to generate a score.

6. The method as described in claim 5 further including applying a character-level embedding to each of the prefix and suffix prior to applying the respective attention-based or convolution-based machine learning.

7. The method as described in claim 1 wherein the arbitrary email address is associated with an attempt by a user to register a new account for a web site or application.

8. The method as described in claim 7 wherein the given mitigation action rejects the attempt to register the new account.

9. An apparatus for real-time account protection, comprising:
one or more hardware processors; and
computer memory holding computer program code executed by the one or more hardware processors and configured to:
receive an arbitrary email address configured as {prefix @suffix.TLD}, wherein TLD is a top-level domain;
apply the arbitrary email address through a machine learning model that has been trained on a corpus of email addresses, wherein an email address of the corpus is configured as {prefix @suffix.TLD}, the machine learning model comprising first and second computational branches, and an output branch that aggregates signaling from the first and second computational branches, and wherein applying the arbitrary email address concurrently processes the prefix of the arbitrary email address through the first computational branch and the suffix.TLD of the arbitrary email address through the second computational branch;
determine whether the arbitrary email address is potentially fraudulent; and
responsive to a determination that the arbitrary email address is potentially fraudulent, take a mitigation account to protect the account.

10. The apparatus as described in claim 9 wherein the first computational branch of the machine learning model comprises a neural network.

11. The apparatus as described in claim 10 wherein the neural network is a multi-head self-attention mechanism.

12. The apparatus as described in claim 9 wherein the second computational branch of the machine learning model comprises a convolutional neural network.

13. The apparatus as described in claim 9 wherein the computer program code is further configured to apply a character-level embedding to the arbitrary email address prior to applying the first and second computational branches of the machine learning model.

14. The apparatus as described in claim 9 wherein the arbitrary email address is associated with an attempt by a user to register a new account for a web site or application, and wherein the computer program code is further configured to reject the attempt to register the new account.

15. The apparatus described in claim 9 wherein the computer program code configured to apply the arbitrary email address through the machine learning model comprises computer program code further configured to:
apply attention-based machine learning to a prefix of the arbitrary email address to generate a first output;
apply convolution-based machine learning to a suffix.TLD of the arbitrary email address to generate a second output;
aggregate the first and second outputs to generate a third output; and
apply the third output through an additional attention layer of the output branch to generate a score.

16. A computer program product comprising a non-transitory computer-readable medium holding computer program code executable by a hardware processor for real-time account protection in a computer network, the computer program code configured to:
receive an arbitrary email address associated with an attempt to register a new account in associated with a protected resource, the arbitrary email address configured as {prefix @suffix.TLD}, wherein TLD is a top-level domain;
apply the arbitrary email address through a machine learning model trained on a corpus of email address training data, the machine learning model comprising first and second computational branches, and an output branch that aggregates signaling from the first and second computational branches, and wherein applying the arbitrary email address concurrently processes the prefix of the arbitrary email address through the first computational branch and the suffix.TLD of the arbitrary email address through the second computational branch;
based on a score generated by the machine learning model, determine whether the arbitrary email address is potentially fraudulent; and
responsive to a determination that the arbitrary email address is potentially fraudulent, take a mitigation account to prevent the new account from being registered.

17. The computer program product as described in claim 16 wherein the first computational branch comprises an attention layer, the second computational branch comprises a convolutional layer, and the output branch comprises an attention layer.

18. The computer program as described in claim 17 wherein the first and second computational branches act upon different embeddings for respective username and domain name portions of the arbitrary email address.

19. The computer program as described in claim 16 wherein the output branch aggregates prefix versus suffix signaling received from the first and second computational branches of the machine learning model.

20. The method as described in claim 1 wherein the output branch aggregates prefix versus suffix signaling received from the first and second computational branches of the machine learning model.

21. The apparatus as described in claim 9 wherein the output branch aggregates prefix versus suffix signaling received from the first and second computational branches of the machine learning model.

* * * * *